United States Patent Office 3,221,007
Patented Nov. 30, 1965

3,221,007
FLUORINE CARBENE CONTAINING COMPOUNDS AND PROCESS FOR THE PREPARATION THEREOF
Tsung-Ying Shen, Westfield, and Lewis H. Sarett, Princeton, N.J., assignors to Merck & Co., Inc., Rahway, N.J., a corporation of New Jersey
No Drawing. Filed Nov. 17, 1961, Ser. No. 153,243
19 Claims. (Cl. 260—210)

This invention is a continuation-in-part of patent application Serial No. 77,008 filed by applicants December 20, 1960, now abandoned.

This invention relates to a new process of preparing fluorine-containing organic compounds and, more particularly, it relates to a process of preparing compounds containing fluoromethyl and difluoromethyl groups.

It is generally recognized in the art that organic compounds containing fluorine are of wide technical importance because of their unusual chemical and physical properties such as high thermal stability and marked resistance to oxidative decomposition. In the field of medicinal organic chemistry, the presence of fluorine in the molecule is known to favorably affect activity. Accordingly, it is desirable to provide methods of introducing fluorine-containing groups into organic compounds, using techniques hitherto not available in the art.

An object of the present invention, therefore, is the provision of a novel process for preparing organic fluorine compound.

Still another object of the invention is to provide a process for synthesizing organic fluorine compounds under non-hazardous conditions.

These and other objects will become apparent from consideration of the following more detailed description of the invention.

In accordance with the present invention, the objects herein mentioned are achieved by the reaction of fluorocarbene and difluorocarbene with carbanions or anions derived from nitrogen.

Typical classes of carbanions serviceable in the reaction are represented by the formula:

where at least one of $R_1$, $R_2$ and $R_3$ provides an activating group which enables the carbanion to form during the reaction. The activating groups usually possess unsaturation which stabilizes the carbanion through the well-known resonance effect. These groups include, among others, carboxy, carboalkoxy, carbonyl, dialkylaminocarbonyl, cyano, phenyl, nitro, sulfonyl, vinyl, substituted vinyl, acetylenic, and halomethyl. The activating group may be of the vinylidene type, thus combining two groups into a single function or phenyl, as in the carbanion of phenyllithium, wherein all three groups are combined as a single activator.

Since the principal reaction in the process is attack at the carbanion center by a fluorocarbene, the nature of the remaining groups of $R_1$, $R_2$ and $R_3$ is not critical. These groups, if organic, can be aliphatic, cycloaliphatic, aromatic or heterocyclic in character. Such a group may be bound directly to the carbanion center through carbon such as ether, ester and tertiary amino. It may also be bound directly to the carbanion center through a noncarbon atom, as in the grouping of alkoxy or acylamino. Although it is preferred to use carbanion compounds which are free of reactive groups other than the carbanion itself, compounds which contain additional reactive groups are operable in the process but will require additional quantities of the fluorocarbene.

The following are examples of typical carbanions used in the process of the present invention.

(1)
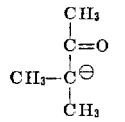
acetyldimethylcarbanion (2)
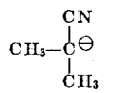
cyanodimethylcarbanion (3)
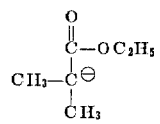
carboethoxymethylcarbanion (4)
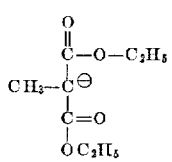
dicarboethoxymethylcarbanion (5)
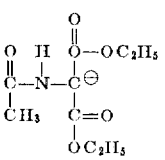
acetylaminodicarboethoxycarbanion (6)
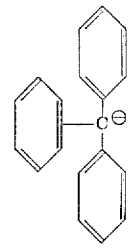
triphenylcarbanion (7)
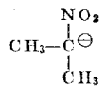
nitrodimethylcarbanion (8)
phenylcarbanion (9)
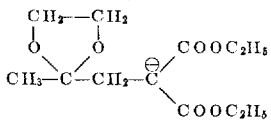
diethyl α-acetoylmalonate dioxolane carbanion

(10)
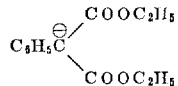
phenyldicarbethoxycarbanion

(11) 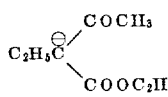

ethyl 2-ethyl-acetoacetatecarbanion

(12) 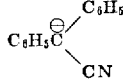

cyanodiphenylcarbanion

(13) 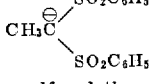

α-α-dibenzenesulfonylethanecarbanion

(14) 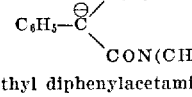

N,N-dimethyl diphenylacetamidecarbanion

(15) $C_6H_5-C{\equiv}C^{\ominus}$ phenylethinylcarbanion

(16) 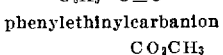

dimethyl α-naphthylmalonatecarbanion

The carbanions as enumerated above may be formed in ways well known in the art. For example, the carbanion may be formed by treatment of a protonated parent compound with a suitable base.

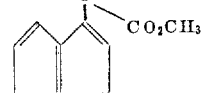

where $B^{\ominus}$ suitably may be alkoxide, hydroxide, hydride, an organo-metallic compound, such as butyllithium, or a Grignard reagent, amines, such as tetraethylguanidine, amides, such as sodamide or potassium diethylamide.

Typical anions derived from nitrogen which may be used in the process of the present invention may be represented by the generic formula:

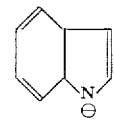

where, as above, at least one of X' and Y' is an activating group which enables the anion to form. The activating groups may be selected from those utilized in the formation of carbanions. The remaining groups also may be chosen in a manner similar to that used for carbanions.

Illustrative anions derived from nitrogen are the following:

(1) 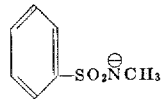

N-methylacetamide anion (2) 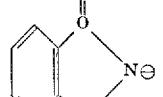

N-propionyl propionamide anion (3) 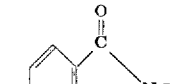

ethyl N-propionylcarbamate anion (4) 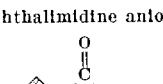

4,4′-dinitrodiphenylamine anion (5) 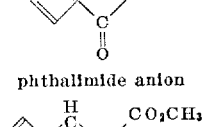

indole anion (6) 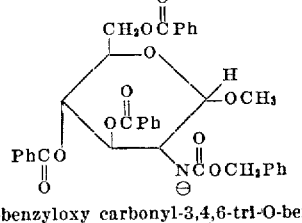

N-methylbenezenesulfonamide anion (7) 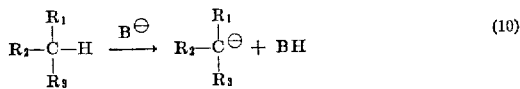

saccharyl anion (8) 

phthalimidine anion (9) 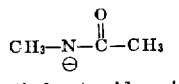

phthalimide anion

(10) 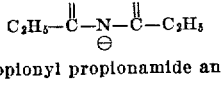

methyl o-acetamido cinnamate anion

(11) 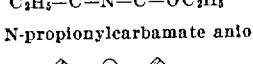

methyl N-benzyloxy carbonyl-3,4,6-tri-O-benzoyl-D-glucosaminide anion

Formation of the anions derived from nitrogen proceeds in a manner similar to that of carbanions. Anion 5, for example, may be derived from the corresponding parent compound, indole, by reaction with a base.

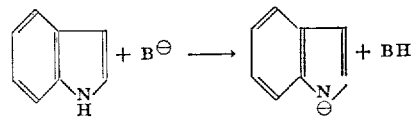

The fluorinating agents used herein are well known in the art and are capable of generating fluorocarbene, CHF and difluorocarbene, $CF_2$ in situ during the reaction. A wide variety of methods have been described in the literature for generating these fluorocarbenes as, for example, reacting chlorodifluoromethane with a base to generate difluorocarbene (Hine and Tanabe, J. Am. Chem. Soc., 80, 3002 (1958). Other methods for generating fluorocarbenes are described in the literature by W. E. Parkam and E. E. Schweizer in the J. Org. Chem., 24, 1733 (1959), and J. M. Bivehall, G. W. Cross and R. N. Haszeldine in the Proc. Chem. Soc., 81 (1960).

In the following description of the generic process of the present invention, reference will be made for convenience only and not as a limitation, to the use of difluorocarbene as the fluoromethylating agent. For illustration purposes only a carbanion will be shown as one of the reactants in the reaction schematic which follows. Accordingly, the over-all process may be summarized as follows:

Formation of organo fluorine compound by reaction of a carbanion with a fluorocarbene:

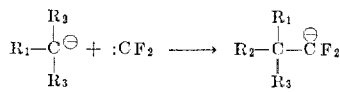

Formation of difluoromethylated compound:

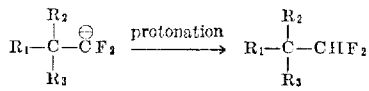

In accordance with the preferred practice of the present invention, the formation of organic fluorene compounds by reaction of a fluorocarbene with a carbanion is preferably carried out in situ in solution in the presence of the base used to form the reactants. Therefore, the compound to be fluoroalkylated is first dissolved in a solvent. Suitable solvents are ethers, such as dimethoxyethane, tetrahydrofuran, diglyme and dioxan, and also hydroxylic solvents, such as water and alcohols. Then the carbanion of the compound is formed by the addition of a suitable base, such as potassium t-butoxide, to the solution. The base is present in an amount at least sufficient to form in situ both the carbanion and the fluorocarbene, and preferably in a slight excess. The product of the reaction between the carbanion and the fluorocarbene then undergoes a protonation to form the desired product. The protonation reaction also may be effected in situ. While the hydrogen containing precursor of the carbanion itself may serve as a protonating source within the reaction medium, it is desirable that an additional proton source be provided therein. A suitable proton source for inclusion in the solution is t-butyl alcohol.

In a typical run, a fluorocarbene precursor, for example, chlorodifluoromethane, is introduced into the basic carbanion solution and the reaction effected between the carbanion and the carbene formed in situ. The reaction is suitably carried out at atmospheric pressure or in a bomb, generally at a temperature of from $-25°$ C. to $100°$ C., and preferably from $0°$ to $25°$ C. The reaction time is usually between 5 minutes and 48 hours. Preferably during this period the contents of the reaction vessel are intimately mixed. The product is thereupon isolated from the mixture by techniques well known in the art, such as solvent extraction and fractional distillation of liquid products, or by fractional crystallization or chromatography of solid products.

The following examples describe in detail certain reactions illustrative of the present invention and the compounds which are thus prepared. However, the invention is not to be constructed as limited thereby either in spirit or in scope, since it would be apparent to those skilled in the art of organic synthesis that many modifications may be practiced without departing from the purpose and intent of this invention. In the examples hereinafter detailed, temperatures are given in degrees centigrade (° C.) and relative amounts of materials in parts by weight except as otherwise noted.

*Example 1.—Preparation of diethyl α-difluoromethyl-α-acetonylmalonate ethylene ketal*

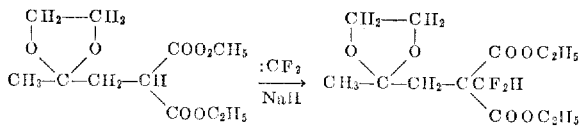

To 7.5 gm. (0.15 M) of a 50% suspension of NaH in mineral oil in 350 ml. dry dimethoxyethane is added 34 gm. (0.13 M) of diethyl-α-acetonylmalonate ethylene ketal with ice cooling. After 30 minutes 14 gm. (0.16 M) of chlorodifluoromethane in 80 ml. dimethoxyethane is added dropwise with ice cooling. Stirring is continued at room temperature for 48 hours. The NaCl is filtered off and 4 gm. of chlorodifluoromethane is added to the solution which is stirred 12 hours more. The solution is filtered, then concentrated on a steam bath in vacuo. The residue is then distilled under high vacuum. Three fractions are collected and redistilled on a spinning band column. 4.95 gm. of diethyl α-difluoromethyl-α-acetonylmalonate ethylene ketal with B.P 105–106°/0.20 mm. and $n_D^{23.5}=1.4325$ is collected. A specimen so prepared was analyzed for $C_{13}H_{20}O_6F_2$: C, 50.32; H, 6.45; F, 12.25. Found: C, 50.65; H, 6.67; F, 11.58.

*Example 2*

Proceeding in a similar manner using an equivalent amount of chlorofluoromethane in place of chlorodifluoromethane in the above example, diethyl α-fluoromethyl-α-acetonylmalonate ethylene ketal is obtained.

Examples 1 and 2 illustrate the use of a carbanion having two activating groups attached thereto.

*Example 3.—Preparation of diethyl α-difluoromethyl-α-phenylmalonate*

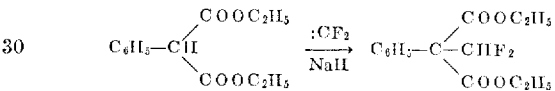

Treatment of the sodio derivative of diethyl phenylmalonate in dimethoxyethane with chlorodifluoromethane in a similar manner gives diethyl α-difluoromethyl-α-phenylmalonate, B.P. 110°/0.22 mm. and $n_D^{23}=1.4741$.

Analyzed for $C_{14}H_{16}O_4F_2$: C, 59.2; H, 5.64; F, 13.26. Found: C, 60.03; H, 5.82; F. 10.18.

Examples 2 and 3 are illustrative of the use of a carbanion as an organic reactant in which there are three activating groups attached thereto.

*Example 4.—Preparation of ethyl α-difluoromethyl-α-ethyl-acetoacetate*

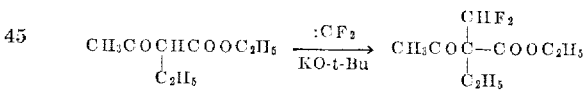

23.70 gm. (0.15 M) of ethyl α-ethylacetoacetate, 33.66 gm. (0.30 M) of K t-butoxide, and 26 gm. (0.30 M) of chlorodifluoromethane in 250 ml. of dry dimethoxyethane are stirred in an ice bath for 2 hours and at room temperature for 15 hours. The neutral solution is poured into 1 liter of ether and 500 ml. of water containing 10 ml. acetic acid. The layers are separated and the ether layer washed with 300 ml. water, then dried over anhydrous sodium sulfate, filtered and concentrated to remove the ether. The product is distilled at water pump pressure and two fractions are collected and redistilled. 13.4 gm. of ethyl α-difluoromethyl α-ethylacetoacetate distills over with B.P. 100–103°/15 mm. and shows $n_D^{21.3}=1.4135$.

*Analysis.*—Calcd. for $C_9H_{14}O_3F_2$: C, 51.92; H, 6.73; F, 18.27. Found: C, 53.40; H, 7.29; F, 20.19.

Example 4 illustrates the use of a carbanion having an acetyl activating group.

*Example 5.—Preparation of α-difluoromethyl-diphenylacetonitrile*

To a suspension of 6.0 g. of sodium hydride (50% in mineral oil) in 200 ml. of dimethoxyethane is added portionwise 19.3 g. (0.1) mole of diphenylacetonitrile with stirring and ice-cooling. After the addition of 7.4 ml. of t-butanol, a solution of 18 g. of chlorodifluoromethane in 50 ml. of dimethoxyethane is added dropwise and the reaction mixture is stirred in the ice-bath for two hours and at room temperature for another two hours. The precipitated sodium chloride (7 g.) is filtered off and the filtrate is concentrated in vacuo to a solid residue. The product is recrystallized twice from hexane to give α-difluoromethyldiphenyl-acetonitrile, M.P. 85°.

Analysis.—Calcd. for $C_{15}H_{11}NF_2$: C, 74.1; H, 4.57; F, 5.76. Found: C, 74.44; H, 4.41; F, 5.89.

Example 5 is illustrative of a carbanion having a nitrile group as an activating group.

Example 6.—Preparation of N-difluoroethyl-α-quinolone

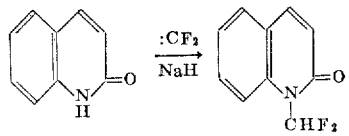

A mixture of 4.2 g. (0.03 mole) of α-quinolone and 0.75 g. of sodium hydride in 60 ml. of dimethoxyethane is stirred in an ice-bath until a clear solution of the sodio derivative of the anion is obtained. A steady stream of chlorodifluoromethane is introduced into the reaction mixture and the resulting solution is allowed to stand at room temperature for 18 hours. The reaction mixture is partitioned between ether and 3% aqueous acetic acid. The ether layer is concentrated and subjected to chromatography on an alumina column and the fractions eluded by mixtures of ether and petroleum ether ranging from 5% to 100% ether. In the range 5%–30% ether the following compound is obtained: 2-difluoromethoxy-quinoline, M.P. 34°.

Calcd. for $C_{10}H_7NOF_2$: C, 61.6; H, 3.59; F, 19.47; N, 7.18. Found: C, 62.66; H, 3.77; F, 15.68; N, 5.10.

In the more polar mixtures from 30%–100% ether the N-difluoroalkylated product desired is obtained: N-difluoromethyl-α-quinolone, M.P. 98° after recrystallization from methanol.

Calcd. for $C_{10}H_7NOF_2$: C, 61.6; H, 3.59; F, 19.48; N, 7.18. Found: C, 61.94; H, 3.42; F, 17.06; N, 6.92.

Infrared absorption spectrum in chloroform shows amide-type carbonyl band at $5.95\mu$ and strong $8{-}5{-}9.5\mu$ absorption suggestive of C=F functionality.

Example 6 is illustrative of the use of an anion derived from nitrogen in a cyclic system, all the groups attached thereto being present as part of a ring system.

Example 7.—Preparation of N-difluoromethyl-2-carbethoxyindole

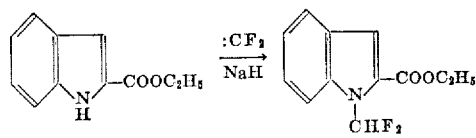

To a suspension of 5.0 g. of sodium hydride emulsion (50% in mineral oil) in 150 ml. of dimethoxyethane is added portionwise 10 g. (0.05 mole) of 2-carbethoxyindole with stirring and ice-cooling. t-Butanol (4 ml.) is added as a proton source and the mixture is stirred in the ice bath for another ½ hour. A solution of chlorodifluoromethane (15 g.) in 40 ml. of dimethoxyethane is added dropwise and the mixture is stirred at ice-bath temperature for 2 hours and at room temperature for 18 hours. The solution is filtered and concentrated in vacuo to dryness. The product was recrystallized from ethanol to give N-difluoromethyl-2-carbethoxyindole, M.P. 95°.

Calcd. for $C_{12}H_{11}NO_2F_2$: C, 60.25; H, 5.07; F, 15.9. Found: C, 60.58; H, 4.51; F, 13.41. The infrared and nuclear magnetic resonance spectrum of the product in chloroform show no N-H band.

Example 7 illustrates the use of an anion derived from nitrogen as an organic reactant, said anion being part of an aromatic heterocyclic system in which the activating group is attached to the ring.

Example 8.—Preparation of dibenzyl α-difluoromethylphenylmalonate

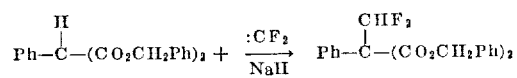

To a solution of dibenzyl phenylmalonate (0.1 mole), sodium t-butoxide (0.12 mole) and t-butanol (0.1 mole) in 300 ml. of dimethoxyethane is added a solution of excess (0.4 mole) of chlorodifluoromethane in 50 ml. dimethoxyethane with ice-cooling and stirring. The mixture is stirred at 0–5° for 2 hours and then at room temperature for 18 hours. The sodium chloride precipitate is filtered off, and the filtrate is diluted with 1 liter of water containing 0.3 mole of acetic acid. The product is extracted with 3 x 300 ml. ether, washed with sodium bicarbonate, water and dried over sodium sulfate. Evaporation of the solution and chromatography of the syrupy residue on an alumina column (800 g., acid-washed) using 3–10% ether in petroleum ether as eluent affords dibenzyl α-difluoromethylphenylmalonate.

Example 8 illustrates the use of a phenyl carboalkoxy activating group.

Example 9.—Preparation of methyl O-(N-difluoromethyl acetamido)cinnamate

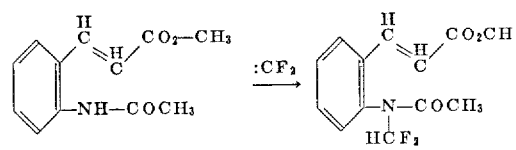

Treatment of methyl O-acetamido cinnamate in dimethoxyethane with potassium t-butoxide and chlorodifluoromethane at 0–5° for 3 hours, followed by chromotography on an alumina column using 40% (v./v.) ether-petroleum-ether as eluent, gives methyl O-(N-difluoromethyl acetamido) cinnamate, melting point, 95–98°.

Example 9 is illustrative of an anion derived from nitrogen in which said anion has two activating groups attached thereto.

Example 10.—Preparation of dimethyl α-difluoromethyl 1-naphthylmalonate

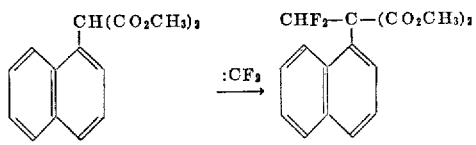

Methyl α-naphthylacetate is treated with dimethyoxalate and sodium hydride or sodium methoxide in ether or benzene in the usual manner to give methyl α-methoxyoxalyl-naphthalene 1-acetate, melting point, 85°.

A mixture of the above ester (8 g.) and Pyrex glass powder (4 g.) is heated in an oil bath at 170–180° for about ¾ hour at 12 millimeters until the evolution of CO has subsided. The melt is dissolved in benzene, filtered and evaporated to a crystalline mass. Recrystallization from methanol gives dimethyl α-naphthylmalonate.

A solution of dimethyl α-naphthylmalonate (5.42 g.) and potassium t-butoxide (4.7 g.) in dimethoxyethane (120 ml.) is treated with excess chlorodifluoromethane at 0–5° for three hours until the pH of the reaction mixture has become 7–8. The solution is poured into iced water and extracted with ether. Evaporation of the ether solution gives a crystalline product which is recrystallized from ether and methanol to give dimethyl α-difluoromethyl 1-naphthylmalonate, melting point, 81.5°–82°.

Example 10 illustrates the use of a higher aromatic ring system as an activating group.

*Example 11.*—*Preparation of methyl N-difluoromethyl-N-benzyloxy carbonyl 3,4,6-tri - O - benzoyl - D - glucosaminide*

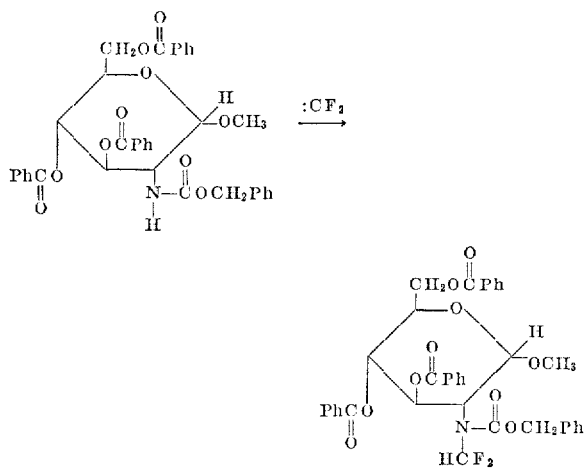

To a solution of methyl N-benzyloxycarbonyl 3,4,6-tri-O-benzoyl-D-glucosaminide (0.03 mole) in 200 ml. dimethoxyethane at —20° to —10° is added a solution of 0.036 mole of potassium t-butoxide in 30 ml. dimethoxyethane dropwise over a period of 10 minutes. The mixture is treated with excess chlorodifluoromethane at ca. —20°, whereupon a mild exothermic reaction is observed. After ½ hour the reaction mixture is poured into iced-water and extracted with ether. Chromatography of the crude product on a silica gel column using benzene-petroleum ether mixture as element gives methyl N-difluoromethyl-N-benzyloxy carbonyl-3,4,6-tri - O - benzoyl-D-glucosaminide.

Example 11 further illustrates the use of an anion derived from nitrogen having a cycloaliphatic ring system as one of the groups attached thereto as an organic reactant.

*Example 12*

Following the general fluoromethylation procedure as described above, 2-nitropropane is fluoromethylated to produce 2-nitro-2-difluoromethylpropane.

Example 12 illustrates the use of a nitro group as an activating group.

*Example 13*

Following the general fluoromethylation procedure as described above, triphenylmethane is fluoroalkylated to produce triphenyldifluoromethylmethane.

Example 13 illustrates the use of three phenyl groups as activating groups.

*Example 14*

Following the general fluoromethylation procedure as described above, phenyllithium is difluoromethylated to produce difluoromethyl benzene.

Example 14 is illustrative of a carbanion in which the three activating groups are combined in the form of an aromatic ring.

*Example 15*

Following the general fluoromethylation procedure as described above, α,α-dibenzenesulfonyl ethane is difluoromethylated to produce α,α-dibenzenesulfonyl difluoromethyl ethane.

Example 15 illustrates the use of a substituted sulfonyl group as an activating group.

*Example 16*

Following the general fluoromethylation procedure as described above, N,N-dimethyl diphenylacetamide is difluoromethylated to produce N,N-dimethyl 3,3-difluoro-2,2-diphenyl propionamide.

Example 16 is illustrative of an acid amide anion derived from nitrogen.

*Example 17*

Following the general fluoromethylation procedure as described above, phenylacetylene is difluoromethylated to produce α-phenyl-β-difluoromethyl acetylene.

Example 17 is illustrative of a carbanion in which the activating groups are all combined in the form of a triple bond.

The following Examples 18 through 33 are further illustrative of the use of activated carbanions and anions derived from nitrogen used in the present invention.

*Example 18*

Following the general fluoromethylation procedure as described above, N-methyl acetamide is difluoromethylated to produce N-difluoromethyl N,N-methyl acetamide.

*Example 19*

Following the general fluoromethylation procedure as described above, N-propionyl propionamide is difluoromethylated to produce N-difluoromethyl N-propionyl propionamide.

*Example 20*

Following the general fluoromethylation procedure as described above, ethyl N-propionyl carbamate is difluoromethylated to produce N-difluoromethyl ethyl N-propionyl carbamate.

*Example 21*

Following the general fluoromethylation procedure as described above, diphenylamide is difluoromethylated to produce N-difluoromethyl diphenylamide.

*Example 22*

Following the general fluoromethylation procedure as described above, indole is difluoromethylated to produce N-difluoromethyl indole.

*Example 23*

Following the general fluoromethylation procedure as described above, N-methyl benzenesulfonyl amide is difluoromethylated to produce N-difluoromethyl N-methyl benzenesulfonyl amide.

*Example 24*

Following the general fluoromethylation procedure as described above, saccharin is difluoromethylated to produce N-difluoromethyl saccharin.

*Example 25*

Following the general fluoromethylation procedure as described above, phthalimidine is difluoromethylated to produce N-difluoromethyl phthalimidine.

*Example 26*

Following the general fluoromethylation procedure as described above, phthalimide is difluoromethylated to produce N-difluoromethyl phthalimide.

From the foregoing discussion it will be clear that the invention is generic to the reaction of a difluorocarbene and a fluorocarbene with a carbanion and an anion derived from nitrogen. The reaction is also applicable to polymers containing carbanions and anions derived from nitrogen. While the invention has been described with particular reference to the use of difluorocarbene and fluorocarbene as preferred fluoromethylating agents, it will be understood that longer chain analogues of these fluorocarbenes, such as vinylogues thereof, may be used as well.

The fluoromethylated compounds produced by the process of the present invention are novel compounds. Physically they may be gases, liquids or solids which can be employed in a large number of fields. They can be used as gaseous or liquid carriers in aerosol sprays in the field of insecticides. They can be used as solvents and thinners in paints. They can also serve as intermediates in the preparation of other fluorine-containing compounds which are difficult to obtain. As an illustration thereof, the ester product of Example 7 may be hydrolyzed in basic solution to form an N-difluoromethyl indole acetic acid, keeping intact the difluoro group. Similarly, the cyano group of Example 5 may be hydrolyzed with base to form the corresponding α-difluoromethyl acid compound. They may serve advantageously as intermediates in the formation of organic compounds having medicinal characteristics. For example, the product of Example 3 may undergo a condensation reaction with a condensing agent, such as urea, to form 5-phenyl-5-difluoromethyl barbituric acid. Derivatives of barbituric acid are well known in the art to be of a class exhibiting useful medicinal properties.

The foregoing detailed description and examples have been given merely to impart clearness of understanding and not as a limitation of the present invention whose generic features will be readily apparent to those skilled in the art from this description. Accordingly, the invention is not limited to the exact details shown and described, but rather is bound solely by the appended claims.

What is claimed is:

1. Compounds of the formula

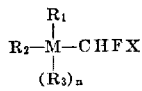

wherein X is selected from the group consisting of hydrogen and fluorine, M is selected from the group consisting of nitrogen and carbon, and $n$ is 1 when M is carbon and at least one of $R_1$, $R_2$, and $R_3$ is an activating group having unsaturation therein selected from the group consisting of carboxy, carboalkoxy, alkoxy, carbonyl, dialkylaminocarbonyl, cyano, phenyl, nitro, sulfonyl, vinyl, acetylenic, and halomethyl, and when M is nitrogen, $n$ is 0 and at least one of $R_1$ and $R_2$ is selected from the group consisting of said activating groups, the remaining groups being selected from the group consisting of hydrogen, lower alkyl, cyclohexyl, and cyclopentyl, said activating groups having unsaturation therein, and radicals wherein said remaining groups form part of a cyclic system.

2. The compounds according to claim 1 wherein $R_1$ is hydrogen.

3. The compounds according to claim 1 wherein X is fluorine.

4. The compounds according to claim 3 wherein M is nitrogen.

5. The compounds according to claim 3 wherein M is carbon.

6. α-Difluoromethyl-diphenylacetonitrile.

7. N-difluoromethyl-2-carbethoxyindole.

8. Dimethyl α-difluoromethyl 1-naphthylmalonate.

9. Methyl N-difluoromethyl-N-benzyloxy carbonyl 3,4,6-tri-O-benzoyl-D-glucosaminide.

10. The method for producing a fluoromethyl organic compound containing a grouping selected from the group consisting of

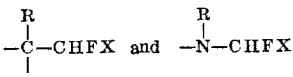

wherein X is selected from the group consisting of hydrogen and fluorine and R is an activating group having unsaturation therein, and the remaining groups of said compound are singly bonded to said grouping, which comprises contacting a compound having a grouping selected from the group consisting of

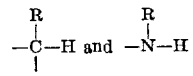

with a fluorocarbene generating compound, said fluorocarbene being selected from the group consisting of difluorocarbene and fluorocarbene, in a solvent system comprising a base.

11. The process according to claim 10 wherein the carbene generating compound is a difluorocarbene generating compound.

12. The process according to claim 11 wherein the carbene generating compound is chlorodifluoromethane.

13. The process according to claim 10 wherein the activating group is selected from the group consisting of carboxy, carboalkoxy, alkoxy, carbonyl, dialkylaminocarbonyl, cyano, phenyl, nitro, sulfonyl, vinyl, acetylenic, and halomethyl groups.

14. The process according to claim 13 wherein said grouping is the nitrogen containing grouping, and the carbene generating compound is a difluorocarbene generating compound.

15. The process according to claim 14 wherein the carbene generating compound is chlorodifluoromethane.

16. The process according to claim 13 wherein the carbene generating compound is selected from the group consisting of chlorodifluoromethane and chlorofluoromethane.

17. The process according to claim 16 wherein the base is an alkali metal t-butoxide.

18. The process according to claim 16 wherein the reaction is run at between −25° C. and 100° C.

19. The process according to claim 10 wherein at least one of said R and remaining groups is hydrogen.

References Cited by the Examiner

UNITED STATES PATENTS 2,411,158  11/1946  Hanford _____ 260—485

OTHER REFERENCES

Leitich, "Osterreichische Chemiker Zeitung," vol. 61, 1960, pp. 164–172.

LEWIS GOTTS, *Primary Examiner.*